(12) United States Patent
Desjarlais et al.

(10) Patent No.: US 9,272,688 B2
(45) Date of Patent: Mar. 1, 2016

(54) METHOD AND SYSTEM FOR SELECTING VEHICLE PERFORMANCE

(71) Applicant: Ford Global Technologies, LLC, Dearborn, MI (US)

(72) Inventors: Frank J. Desjarlais, Canton, MI (US); Thomas Lee Miller, Ann Arbor, MI (US); Daniel M. King, Northville, MI (US); Charles Richard Drake, Northville, MI (US); Eric L. Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 14/245,924

(22) Filed: Apr. 4, 2014

(65) Prior Publication Data

US 2015/0283975 A1   Oct. 8, 2015

(51) Int. Cl.
*G05D 1/00*   (2006.01)
*G05B 19/00*  (2006.01)
*B60R 25/24*  (2013.01)

(52) U.S. Cl.
CPC ..................................... *B60R 25/24* (2013.01)

(58) Field of Classification Search
USPC ............................................. 701/2; 340/5.61
See application file for complete search history.

(56) References Cited

U.S. PATENT DOCUMENTS

| | | | |
|---|---|---|---|
| 6,650,224 B1 | 11/2003 | Weigl et al. | |
| 7,424,361 B2 | 9/2008 | Masuda et al. | |
| 7,463,134 B1 * | 12/2008 | Stilley | 340/5.61 |
| 7,822,514 B1 | 10/2010 | Erickson | |
| 8,554,437 B2 | 10/2013 | Kluka et al. | |
| 8,933,782 B2 * | 1/2015 | Pierfelice et al. | 340/5.83 |
| 2004/0135670 A1 * | 7/2004 | Guba | 340/5.21 |
| 2006/0259287 A1 * | 11/2006 | Jacquelin et al. | 703/8 |
| 2009/0033150 A1 * | 2/2009 | Ko et al. | 307/10.6 |
| 2010/0211254 A1 | 8/2010 | Kimura et al. | |
| 2011/0215899 A1 * | 9/2011 | Van Wiemeersch et al. | 340/5.24 |
| 2011/0215901 A1 * | 9/2011 | Van Wiemeersch et al. | 340/5.54 |
| 2012/0029729 A1 * | 2/2012 | Weslati et al. | 701/2 |
| 2012/0197508 A1 * | 8/2012 | Seaman et al. | 701/102 |
| 2013/0214900 A1 * | 8/2013 | Mitchell | 340/5.61 |
| 2013/0275023 A1 * | 10/2013 | Gregg et al. | 701/102 |
| 2014/0203906 A1 * | 7/2014 | Miyazawa | 340/5.61 |
| 2015/0051819 A1 * | 2/2015 | Ellis et al. | 701/113 |

* cited by examiner

*Primary Examiner* — Thomas G Black
*Assistant Examiner* — Tyler Paige
(74) *Attorney, Agent, or Firm* — Julia Voutyras; Alleman Hall McCoy Russell & Tuttle LLP

(57) ABSTRACT

Methods and systems for selecting vehicle operating modes in response to output of remote security token devices are described. In one example, a vehicle operating mode may be determined when two key fobs having different, but valid, security token assignments are present within a vehicle cabin. Further, one mode of a two mode key fob may be selectively deactivated and reactivated to provide system flexibility.

20 Claims, 6 Drawing Sheets

METHOD AND SYSTEM FOR SELECTING VEHICLE PERFORMANCE

FIELD

The present description relates to methods and systems for selecting levels of vehicle performance. The methods and systems may be particularly useful for limiting vehicle performance when the vehicle's owner desires to restrict vehicle performance for other drivers.

BACKGROUND AND SUMMARY

A vehicle may be designed to provide a driver with a high level of performance. The high level of performance may be achieved by turbocharging the engine, supercharging the engine, or selecting cams and other components that may provide efficient air induction. On occasion, the vehicle's owner may wish to loan out the vehicle and limit the vehicle's performance. One way of limiting performance for a loaned out vehicle is to provide different keys for different levels of desired vehicle performance. For example, a first key may be provided for a standard or lower level of vehicle performance. The first key may include a first set of engine and/or transmission control parameters that limit vehicle performance, or the first key may transmit a code that instructs an engine controller to select the first set of engine and/or transmission control parameters with which to operate the vehicle. A second key, similar to the first key, may transmit a set of higher performance level (e.g., race track performance) control parameters or a code that instructs the engine controller to select the second set of engine and/or transmission control parameters with which to operate the vehicle in a higher performance mode.

Some vehicle manufacturers have designed alternative ways to start a vehicle that do not require a key with a blade that is inserted into keyway of a lock. Rather, the key and blade are replaced by a bladeless key fob. The key fob may be detected upon the key fob entering a vehicle's cabin where signals may be transmitted between the key fob and an engine or vehicle controller. If a first key fob is programmed to provide an indication for operating the vehicle with a standard or lower level of vehicle performance and a second key fob is programmed to provide an indication for operating the vehicle with a higher level of performance, the engine or vehicle controller may not be able to decide whether to operate in the standard performance mode or higher performance mode when both the first and second key fob are within the vehicle's passenger cabin.

The inventors herein have recognized the above-mentioned disadvantages and have developed a method for selecting vehicle performance, comprising: selecting a first vehicle performance level and operating a vehicle at the first vehicle performance level in response to a key fob being within a vehicle cabin and outside of a key fob holder; and selecting a second vehicle performance level and operating the vehicle in at the second vehicle performance level in response to a key fob being within the key fob holder.

By only selecting a higher vehicle performance level in response to a key fob being placed into a key fob holder, a vehicle controller may reserve a higher level of vehicle performance based on a qualified key fob being placed in a key holder. Otherwise, the controller may default to a lower level of vehicle performance when one or more key fobs are within a vehicle cabin, but not in the key fob holder. In this way, a driver may positively select a vehicle's performance mode based on whether or not the driver chooses to place a high performance qualified key fob (e.g., key fob that carries or broadcasts a token to permit the higher level of vehicle performance) that has been assigned to the vehicle in the vehicle's key fob holder. The standard level of vehicle performance may be provided when the qualified key fob or a key fob assigned to the vehicle but not qualified to enable the higher vehicle performance level are outside of the key fob holder.

The present description may provide several advantages. Specifically, the approach may allow a vehicle owner to selectively provide authorization to enable a higher level of performance in a vehicle. Additionally, the approach may avoid confusion between selecting different vehicle operating modes when key fobs programmed to authorize different levels of vehicle performance are simultaneously present in a vehicle's cabin. Further, the approach provides a definitive way for selecting a higher vehicle performance level.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
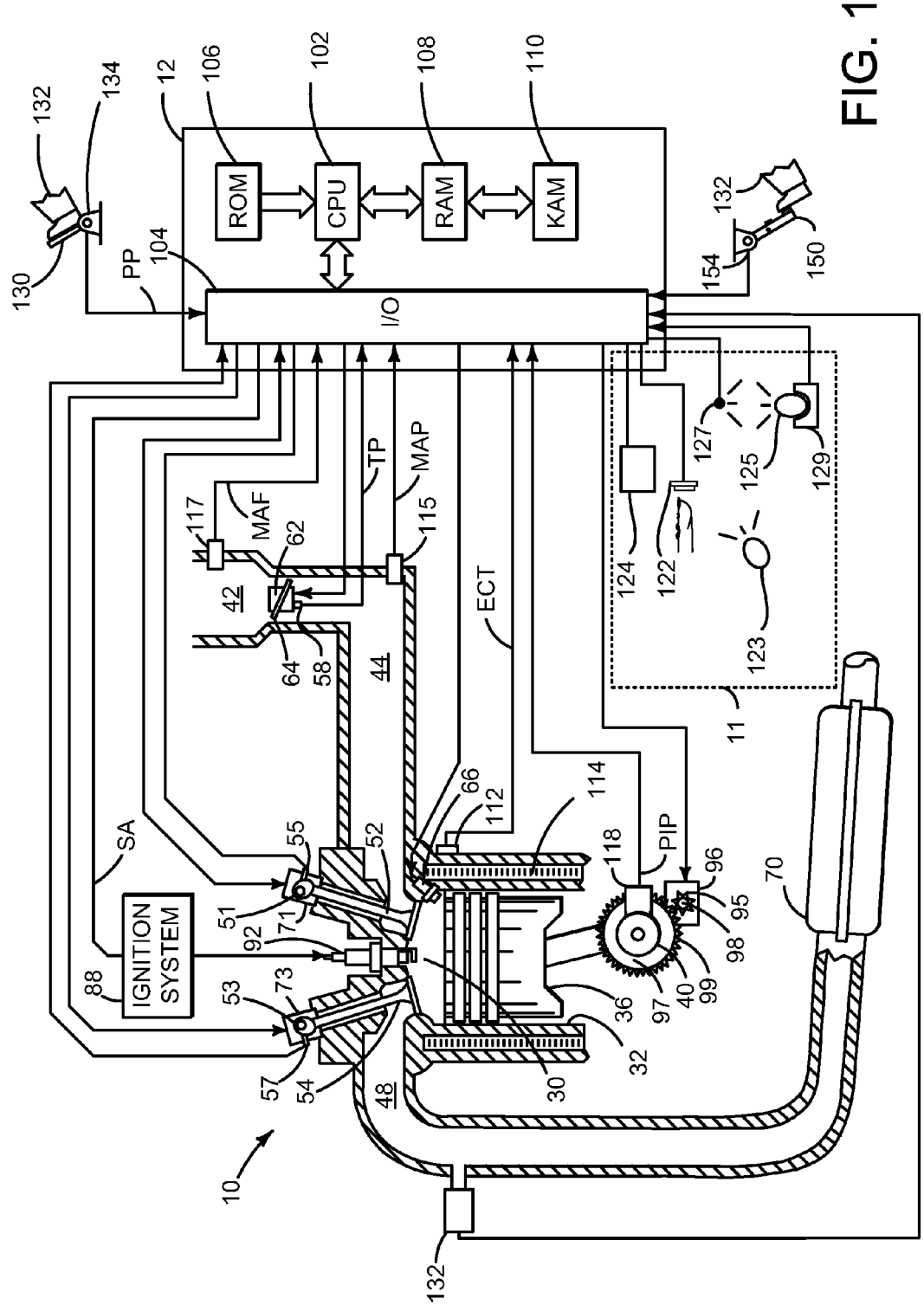
FIG. 1 is a schematic diagram of an engine.
Figure 2:
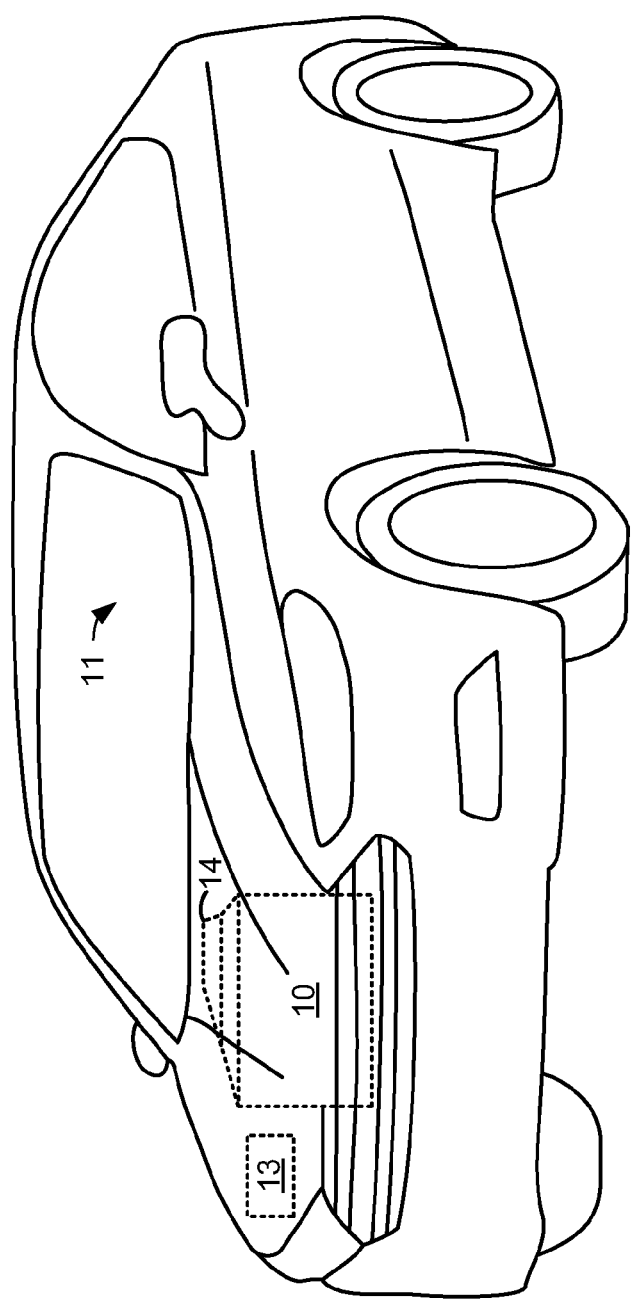
FIG. 2 is a schematic diagram of a vehicle.
Figure 3:
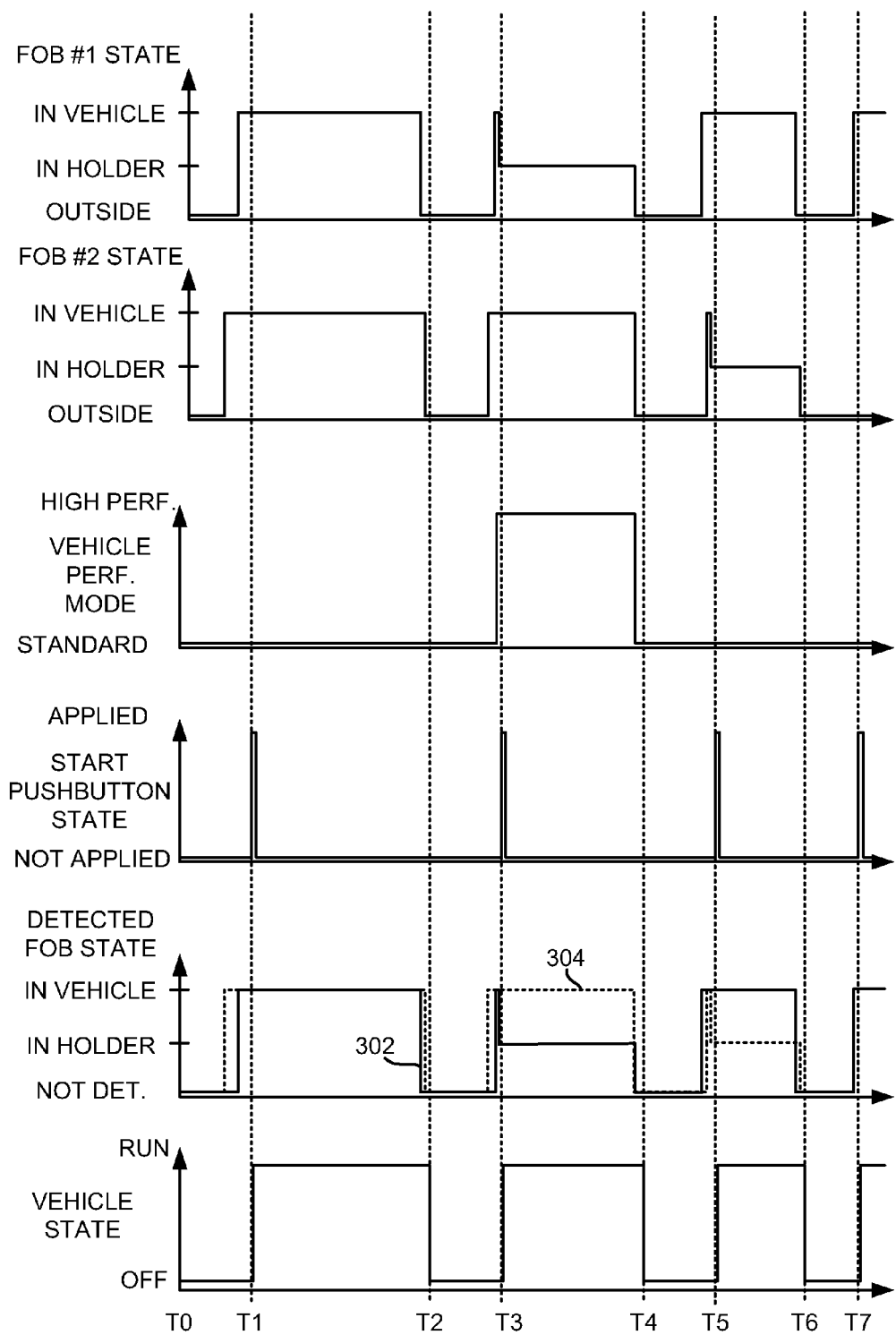
FIG. 3 shows examples sequences for selecting vehicle performance modes.

The present description is related to selecting a vehicle performance level. A vehicle may be operated at one or more performance levels, one performance mode at a time. For example, a vehicle may be operated at a standard or lower performance level by operating the vehicle's engine and/or transmission based on a first group of vehicle control parameters. The same vehicle may be operated at a higher performance level by operating the vehicle's engine and/or transmission based on a second group of vehicle control parameters. FIG. 1 shows an example engine that may be operated with different sets or groups of control parameters. The engine of FIG. 1 may be included in a vehicle as shown in FIG. 2. The vehicle performance level may be selected as shown in the sequence of FIG. 3. The vehicle performance level may be selected based on the method of FIGS. 4 and 5. A vehicle's performance level may be selected according to a security token (e.g., a sequence of numbers for matching to a unique vehicle security clearance sequence) provided via a key fob as shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via valve adjusting mechanisms 71 and 73. Valve adjusting mechanisms 71 and 73 may also deactivate intake and/or exhaust valves in closed positions so that intake valve 52 and exhaust valve 54 remain closed during a cylinder cycle.

Engine starter 96 may be selectively engaged in response to a driver activating pushbutton 122, a key switch, or other actuator. Pushbutton 122 is located in a vehicle's passenger cabin 11 along with user input display 124, transmitter/receiver 127, and key fob holder 129. A driver may carry first key fob 123 and/or second key fob 125 into cabin 11. Key fobs 123 and 125 may broadcast and receive data from transmitter/receiver 127. A more detailed sketch of key fobs 123 and 125 is provided in FIG. 6. Key fob holder 129 may supply an electrical field to supply power to key fob 125 if a battery (not shown) within key fob 125 is at a low energy storage level. Key fob holder 129 may also provide a communication link between key fob 125 and controller 12 if the battery within key fob 125 is at a low energy storage level. Key fob holder may be shaped to be in mating engagement with the Key fob when the Key fob is held by the Key fob holder, as shown in FIG. 1. As described herein whether or not the controller determines if the Key fob is outside of, or within, a key fob holder may be based on various communications between the two and/or based on physical contact or a physical connection between the two. In one example, only in the situation of physical contact between the key fob and the holder (e.g., when the key fob is matingly positioned and held by the holder without any other mechanism holding the key fob), may selected vehicle operations be enabled.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 132s shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 115 coupled to intake manifold 44; an engine position sensor from a Hall effect sensor 118 sensing crankshaft 40 position; a measurement of air mass entering the engine from sensor 117; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring to FIG. 2 a vehicle 2 including an engine 10, an electrical machine 14, and an electrical energy storage device 13 is shown. Vehicle 2 also includes a passenger cabin 11.

In one example, the vehicle may be propelled solely via the engine 10, solely via an electrical machine 14, or by both the engine 10 and the electrical machine 14. In some example, the only source of propulsion is electric machine 14. The electrical machine 14 may be supplied electrical power via the electrical energy storage device 13. The electrical energy storage device 13 may be recharged via the vehicle's kinetic energy or via engine 10 providing power to electrical machine 14. The electric machine 14 may convert the vehicle's kinetic energy or engine torque into electrical energy which is stored in electric energy storage device 13. Electrical energy storage device 13 may also be recharged from a stationary power grid via a home charging system or a remote charging system (e.g., a charging station). In one example, electrical energy storage device 13 is a battery. Alternatively, electrical energy storage device 13 may be a capacitor or other storage device. Torque provided to vehicle wheels by the engine, motor, or engine and motor is based on a driver torque demand input via the accelerator pedal 130.

Vehicle 2 is shown with internal combustion engine 10, and it may be selectively coupled to an electric machine 14. Internal combustion engine 10 may combust petrol, diesel, alcohol, hydrogen, or a combination of fuels.

Thus, the system of FIGS. 1 and 2 provides for a vehicle performance control system, comprising: a first vehicle performance selecting device for solely activating a first vehicle operating performance level; a second vehicle performance selecting device for activating the first vehicle operating performance level or a second vehicle operating performance level; and a controller including executable instructions to operate a vehicle in the first vehicle operating performance level or the second vehicle operating performance level depending on a position of the second vehicle performance selecting device within a vehicle cabin. The vehicle performance control system includes where the first vehicle operating performance level is a lower vehicle performance level than the second vehicle operating performance level, and where the vehicle is operated when in the first vehicle operating performance level and the second vehicle operating performance level. The vehicle performance control system includes where the second vehicle performance selecting device includes one or more switches for deactivating the second vehicle performance level.

In some examples, the vehicle performance control system includes where the second vehicle performance selecting device includes circuitry to deactivate the second vehicle performance level for a predetermined amount of time. The vehicle performance control system includes where the second vehicle performance selecting device include circuitry for automatically reactivating the second vehicle performance level after the predetermined amount of time. The vehicle performance control system further comprises additional instructions to operate the vehicle in the first vehicle operating performance level in response to the first vehicle performance selecting device being within the vehicle cabin.

Referring now to FIG. 3, a plot of an example sequence for selecting vehicle performance modes is shown. The sequence of FIG. 3 may be provided by the system of FIGS. 1 and 2 according to the method of FIGS. 4 and 5. Vertical lines T0-T7 represents times of interest during the sequence.

The first plot from the top of FIG. 3 is a plot of key fob #1 state versus time. The states of key fob #1 may be outside the vehicle cabin (OUTSIDE), inside the vehicle (IN VEHICLE), and within the key fob holder (IN HOLDER). The states of key fob #1 are based on placement of key fob #1 by the key fob user (e.g., a person). The Y axis represents key fob #1 state and each state is indicated along the Y axis. The X axis represents time and time increases from the right side of FIG. 3 to the left side of FIG. 3. In this example, key fob #1 is programmed to enable high performance mode when key fob #1 is installed in the key fob holder and to enable standard performance mode when key fob #1 is not installed in the key fob holder.

The second plot from the top of FIG. 3 is a plot of key fob #2 state versus time. The states of key fob #2 may be outside the vehicle cabin (OUTSIDE), inside the vehicle (IN VEHICLE), and within the key fob holder (IN HOLDER). The states of key fob #2 are based on placement of key fob #2 by the key fob user (e.g., a person). The Y axis represents key fob #2 state and each state is indicated along the Y axis. The X axis represents time and time increases from the right side of FIG. 3 to the left side of FIG. 3. In this example, key fob #2 is not programmed to enable high performance mode when key fob #2 is installed in the key fob holder and to enable standard performance mode when key fob #2 is not installed in the key fob holder. Key fob #2 enables standard performance mode when key fob #2 is installed in the key fob holder.

The third plot from the top of FIG. 3 is a plot of vehicle performance mode versus time. The vehicle may be in standard performance mode or high performance mode. The vehicle is in standard performance mode when the trace is near the X axis. The vehicle is in the high performance mode when the trace is near the Y axis arrow. The X axis represents time and time increases from the right side of FIG. 3 to the left side of FIG. 3.

The fourth plot from the top of FIG. 3 is a plot of the start pushbutton state (e.g., 122 of FIG. 1) versus time. The start pushbutton may be applied or not applied. The driver requests a vehicle start when the start pushbutton is applied. The start pushbutton state is not applied when the trace is near the X axis. The start pushbutton state is applied when the trace is near the Y axis arrow. The X axis represents time and time increases from the right side of FIG. 3 to the left side of FIG. 3.

The fifth plot from the top of FIG. 3 is a plot of detected key fob state. Each of key fobs #1 and #2 states may be outside the vehicle cabin (OUTSIDE), inside the vehicle (IN VEHICLE), and within the key fob holder (IN HOLDER). The states of key fobs #1 and #2 are based detection of the fobs within the passenger cabin. The state of key fob #1 is represented by solid line 302 and the state of key fob #2 is represented by dashed line 304. Key fobs #1 and #2 are in the same state when only solid line 302 is visible. A key fob may be detected when the key fob is a key fob that broadcasts a signal that is verified to have authority to allow operation of the vehicle. In this example, both key fob #1 and key fob #2 possess a token (e.g. encoded signal) that allows activation of the vehicle. The X axis represents time and time increases from the right side of FIG. 3 to the left side of FIG. 3.

The sixth plot from the top of FIG. 3 is a plot of the vehicle operating state versus time. The vehicle state may be off or activated. The vehicle is off when the trace is near the X axis. The vehicle is active when the trace is near the Y axis arrow. The vehicle's engine and/or motor may be activated when the vehicle is activated. The X axis represents time and time increases from the right side of FIG. 3 to the left side of FIG. 3.

At time T0, the engine is not running as indicated by the engine state trace being near the X axis. Further, key fobs #1 and #2 are outside the vehicle and are not detected. The vehicle is in default standard mode (e.g., lower performance mode) and the start pushbutton is not applied.

Between time T0 and time T1, both key fob #1 and #2 enter the vehicle's cabin. Further, both key fobs are detected in the passenger cabin and the vehicle remains in standard performance mode. The driver has not attempted to start the vehicle via the pushbutton and the vehicle is in standard performance mode.

It should be noted that the driver requests vehicle operation via applying the start push button. A request for vehicle operation may include starting an internal combustion engine, activating a motor, or starting an engine and activating a motor.

At time T1, the driver applies the start pushbutton to request vehicle operation. Since both key fob #1 and key fob #2 are within the vehicle cabin and authorized to activate the vehicle, the vehicle enters run mode where engine or motor torque may be applied to vehicle wheels. Engine or motor torque may not be applied to vehicle wheels when the vehicle is not activated. The start pushbutton is released shortly after time T1.

Between time T1 and time T2, the vehicle is in run state or mode and operating in standard performance mode. In standard performance mode, less torque may be applied to vehicle wheels as compared to when the vehicle is operated in high performance mode. Further, vehicle speed, rate of wheel torque change, engine torque change, and motor torque change may be limited. Shortly before time T2, the both key fob #1 and key fob #2 exit the vehicle in response to the driver and/or passenger leaving the passenger cabin. The detected fob state for both fob #1 and fob #2 also indicate no fobs present.

At time T2, the vehicle enters an off state in response to key fob #1 and key fob #2 not being in the vehicle cabin. In some examples, the driver may apply the start engine pushbutton to stop the engine. The vehicle remains in an off state until time T3. Shortly before time T3, both key fob #1 and key fob #2 enter the vehicle cabin and key fob #1 is placed in the key fob holder. Both key fob #1 and key fob #2 are detected in the cabin and key fob #1 is detected in the key fob holder.

At time T3, the driver applies the start pushbutton and the pushbutton state changes from not applied to applied. The vehicle enters run state and the vehicle is transitioned to a higher performance state as indicated by the vehicle mode trace transitioning to a higher level in response to key fob #1 being in the key fob holder and the start pushbutton being applied. Shortly thereafter, the start pushbutton is not applied and the vehicle continues to operate in the high performance mode. Each of key fob #1 and key fob #2 remain in their respective positions until shortly before time T4.

At time T4, the vehicle enters an off state in response to key fob #1 and key fob #2 not being in the vehicle cabin. The vehicle defaults back to standard performance mode in response to key fob #1 leaving the key fob holder. The vehicle remains in an off state until time T5. Shortly before time T5, both key fob #1 and key fob #2 enter the vehicle cabin and key fob #2 is placed in the key fob holder. Both key fob #1 and key fob #2 are detected in the cabin and key fob #2 is detected in the key fob holder.

At time T5, the driver applies the start pushbutton and the pushbutton state changes from not applied to applied. The vehicle enters run state and the vehicle remains in the standard performance mode as indicated by the vehicle mode trace staying near the X axis. The vehicle remains in the standard performance mode in response to key fob #1 being outside the key fob holder and the start pushbutton being applied. Since key fob #2 is not programmed to allow activation of the high performance mode, the vehicle is activated in the lower performance mode. Each of key fob #1 and key fob #2 remain in their respective positions until shortly before time T6.

At time T6, the vehicle enters an off state in response to key fob #1 and key fob #2 not being in the vehicle cabin. The vehicle stays in the standard performance mode in response to key fob #1 leaving the key fob holder. The vehicle remains in an off state until time T7. Shortly before time T7, key fob #1 enters the vehicle cabin without key fob #2. Key fob #1 is detected in the cabin, not in the key fob holder.

At time T7, the driver applies the start pushbutton and the pushbutton state changes from not applied to applied. The vehicle enters run state and the vehicle remains in the standard performance mode as indicated by the vehicle mode trace staying near the X axis. The vehicle remains in the standard performance mode in response to key fob #1 being outside the key fob holder and the start pushbutton being applied. Since key fob #2 is not in the vehicle it does not affect vehicle operation. The driver releases the pushbutton soon after time T7.

Thus, the vehicle may operate in a standard or high performance mode in response to locations of key fobs #1 and #2. Further, key fob #1 is programmed to allow a high performance mode or a standard performance mode base it its position in the vehicle cabin. In one example, key fob #1 and key fob #2 may be assigned to the vehicle and each key fob may be assigned a unique security token (e.g., a bit pattern or data sequence) so that a vehicle controller may determine which vehicle operation mode is authorized.

Figure 4:
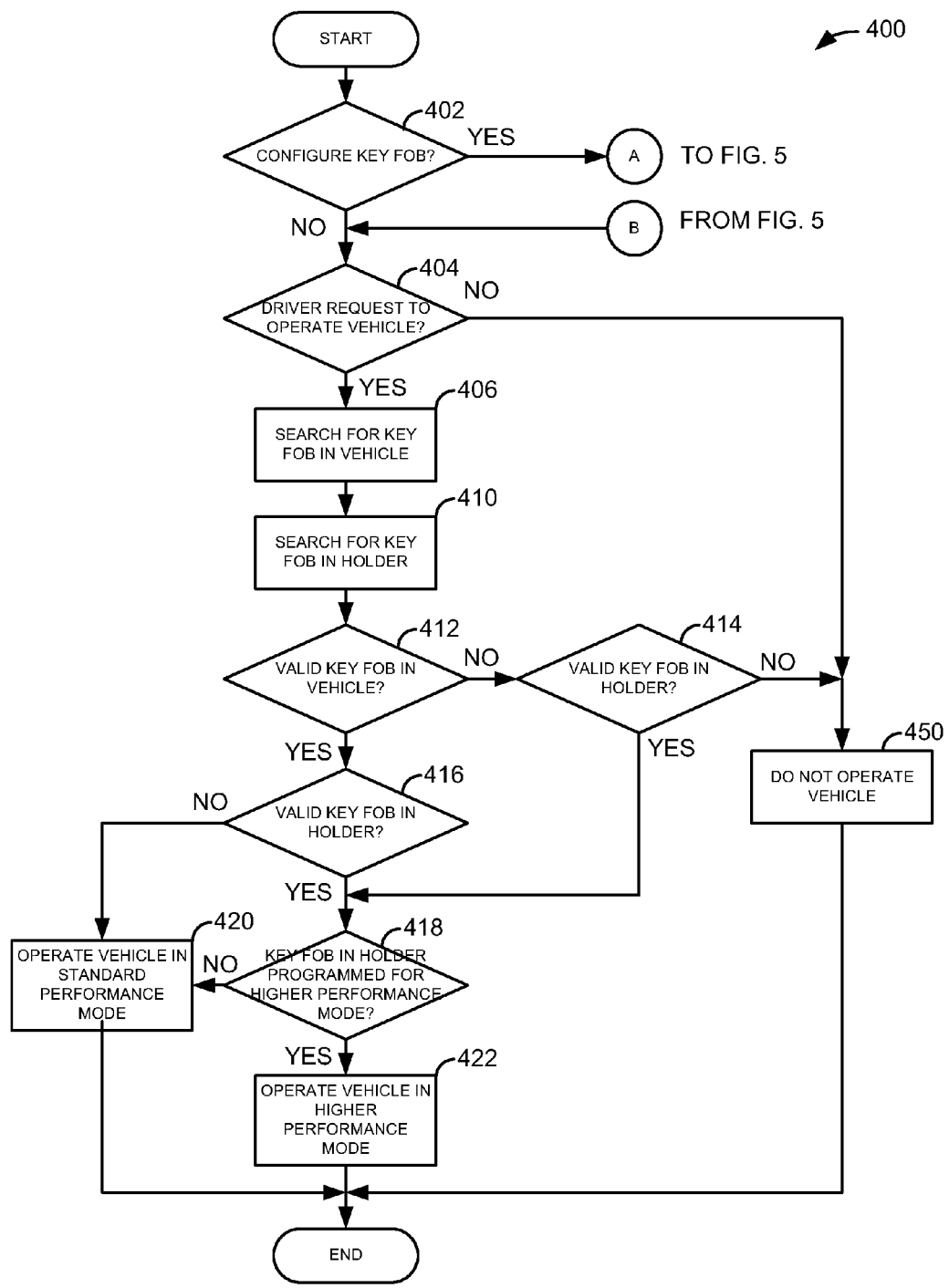
FIG. 4 shows a method for selecting a vehicle performance level.
Figure 5:
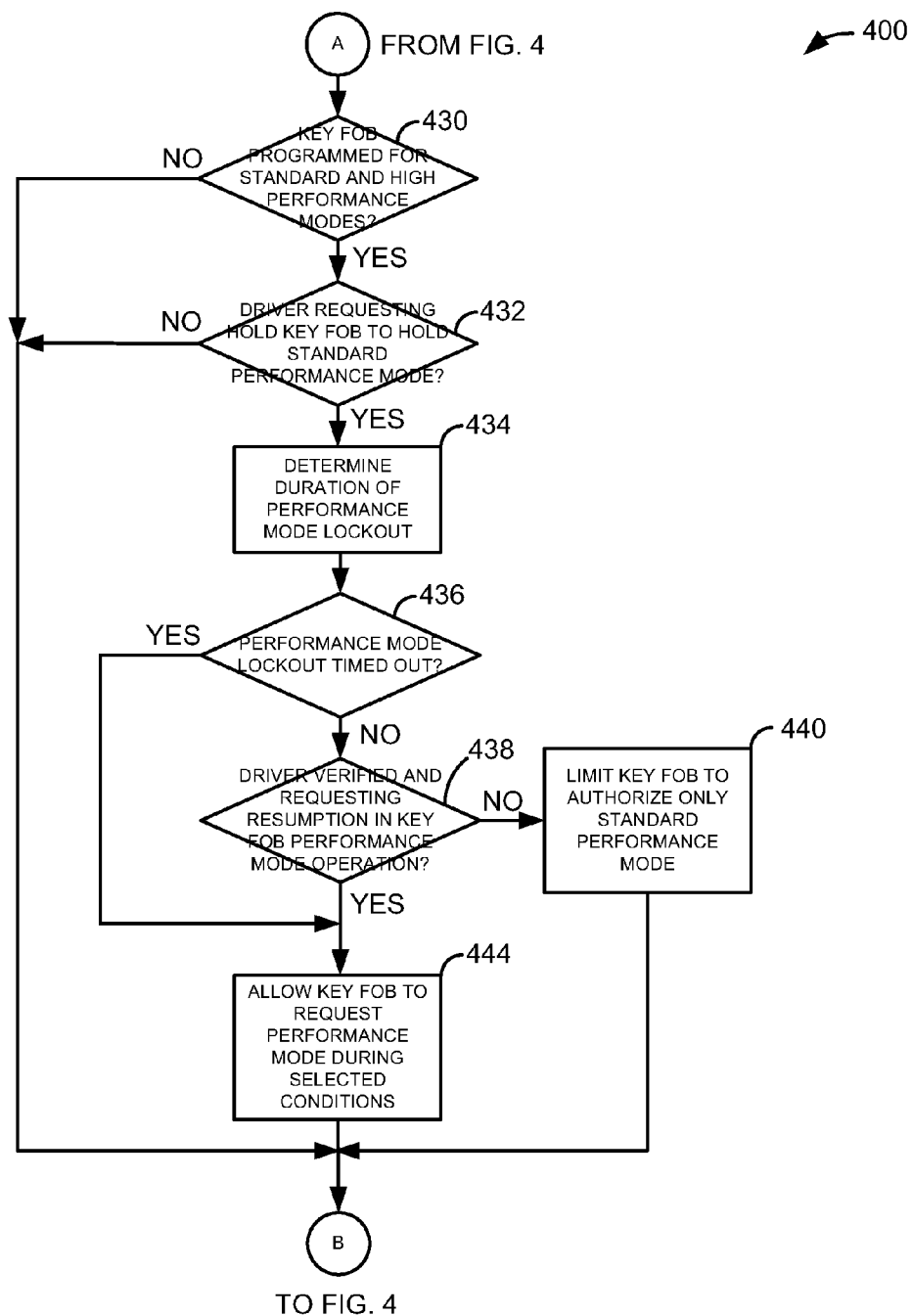
FIG. 5 shows a continuation of the method of FIG. 4.
Figure 6:
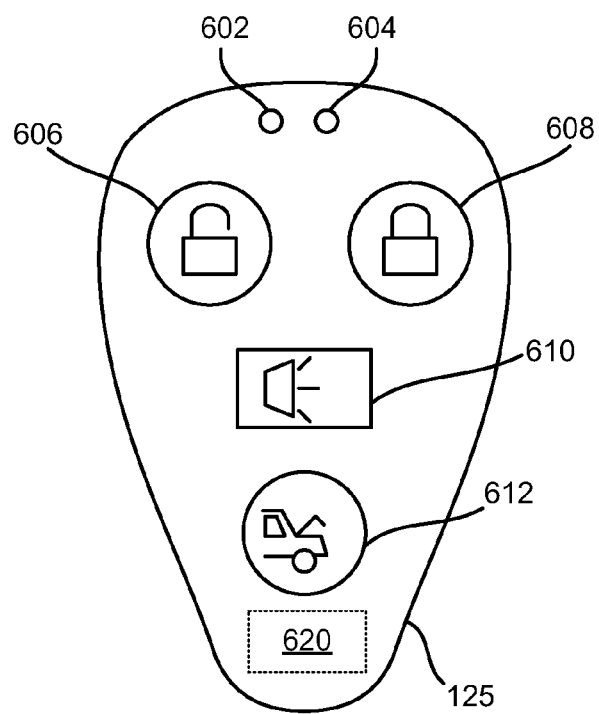
FIG. 6 shows an example key fob.

Referring now to FIGS. 4 and 5, a method for selecting vehicle performance level is shown. The vehicle may include an internal combustion engine, solely a motor, or a motor and an engine. The method of FIGS. 4 and 5 may be included in the system of FIGS. 1 and 2. Further, the method may be stored in non-transitory memory as executable instructions.

At 402, method 400 judges whether or not to configure a key fob. In one example, a key fob may include a micro controller, application specific integrated circuit, or other circuitry to enable or disable authorization of a high performance vehicle operating mode (e.g., a track mode). In one example, method 400 may judge to allow configuration of a key fob in response to a person activating a predetermined sequence of switches on a key fob. For example, configuration of a key fob may take place in response to two key fob buttons being applied for a predetermined amount of time and then pressing key fob buttons in a predetermined order. If method 400 judges that the key fob is to be configured, the answer is yes and method 400 proceeds to 430. Otherwise, the answer is no and method 400 proceeds to 404.

At 430, method 400 judges whether or not the key fob is programmed for standard and high performance vehicle operating modes. In some examples, a vehicle may be supplied with fobs that allow standard and high performance modes as well as fobs that allow only standard operating mode. The fobs that allow standard and high performance mode may have additional circuitry. In one example, a key fob that is programmed for standard and high performance operating modes may have a security token that is different from a key fob that is programmed for only standard vehicle operating mode. While both key fobs provide authorization (e.g., via a broadcast RF signal) to a same vehicle they are assigned, the sequence or toke broadcast by each key fob may be different. However, if the high performance mode is temporarily deactivated (e.g., by deactivating the high performance security token radio frequency broadcast) in one key fob, both key fobs may transmit or broadcast the same vehicle operation authorization sequence. If method 400 judges that the key fob is programmed for standard and high performance vehicle operating modes, the answer is yes and method 400 proceeds to 432. Otherwise, the answer is no and method 400 proceeds to 404.

At 432, method 400 judges whether or not the person in possession of the key fob is requesting to hold the key fob in a mode where only the standard vehicle operating mode is permitted or authorized by the key fob. The person may request the key fob be placed in a mode that only authorizes the standard vehicle mode by performing a predetermined task to authorize such mode. In one example, the person presses buttons on the fob that act as switches in a predetermined order to request the key fob operate to only allow the standard vehicle operating mode. If method 400 judges that the key fob is requested to be held to only authorizing the standard vehicle operating mode, the answer is yes and method 400 proceeds to 434. Otherwise, the answer is no and method 400 proceeds to 404.

At 434, method 400 determines the duration of time that the key fob is to lockout, or not authorize, the high performance vehicle operating mode. Thus, the key fob only authorizes the standard vehicle operating mode when high performance vehicle operating mode is locked out or prohibited via the key fob. In one example, the key fob only reauthorizes the high performance vehicle operating mode when a person operates switches on the key fob in a predetermined sequence. In other examples, the person operating the key fob may apply one or more switches (e.g., pushbuttons) on the key fob to define a time duration that authorization of high performance vehicle operation mode is deactivated. In still other examples, the high performance vehicle operation is not authorized via the key fob for a predetermined amount of time (e.g., 24 hours). Method 400 proceeds to 436 after the duration the key fob is not allowed to authorize the high performance vehicle operating mode is determined.

At 436, method 400 judges whether the high performance mode lockout is timed out. In other words, method 400 judges whether or not an amount of time the key fob is not allowed to authorize high performance vehicle operating mode has expired. If method 400 judges that the amount of time to prohibit the key fob from authorizing the high performance vehicle operating mode has not expired, the answer is no and method 400 proceeds to 438. Otherwise, method 400 proceeds to 444. The high performance mode lockout may be timed out when a timer in a microcontroller exceeds a threshold value or reaches zero.

At 438, method 400 judges if the person in possession of the key fob has input a security sequence (e.g., predetermined order of key selection) into the key fob that allows the key fob to authorize high performance vehicle operating mode. If method 400 judges that a person has input the security sequence, the answer is yes and method 400 proceeds to 444. Otherwise, the answer is no and method 400 proceeds to 440.

At 440, method 400 limits the key fob to authorize only standard vehicle performance mode. In one example, the key fob transmits or broadcasts a first sequence, a same sequence as another key fob having ability to authorize only standard vehicle performance mode in its assigned vehicle (e.g., a vehicle with which the key fob is paired an programmed to operate with), upon entry to a vehicle cabin. The first sequence authorizes the standard vehicle performance mode whether the key fob is in the passenger cabin or in the key fob holder in the passenger cabin. Method 400 proceeds to 404 after the first key fob sequence is permitted by the key fob.

At 444, method 400 allows the key fob to authorize the high performance vehicle operating mode. In one example, the key fob transmits or broadcasts a second sequence upon entry to the vehicle cabin. The second sequence authorizes the high performance vehicle operating mode in the vehicle to which the key fob is assigned when the key fob is installed in the key fob holder. The second sequence authorizes the standard vehicle performance mode when the key fob is in the passenger cabin, but not in the key fob holder. Method 400 proceeds to 404 after the key fob is allowed to authorize the high performance vehicle operating mode.

At 404, method 400 judges whether or not a driver has requests vehicle operation. In one example, the driver requests vehicle operation via pressing a start pushbutton. The start push button may activate a motor or an engine. If method 400 judges that a driver is requesting vehicle operation, the answer is yes and method 400 proceeds to 406. Otherwise, the answer is no and method 400 proceeds to 450.

At 450, method 400 prohibits vehicle operation. Method 400 may prohibit vehicle operation via ceasing to supply fuel and spark to an engine. Alternatively, method 400 may cease current flow to a motor. Method 400 proceeds to exit after vehicle operation is prohibited.

At 406, method 400 searches for one or more key fobs in the vehicle and that are assigned to the vehicle. In one example, method 400 broadcasts a signal for key fobs within the vehicle's cabin and waits for one or more key fobs to respond back with operation to start the vehicle and indicate the vehicle operating mode (e.g., standard or high performance). Method 400 proceeds to 410 after searching for key fobs in the vehicle cabin.

At 410, method 400 searches for a key fob in a key fob holder. In one example, the key fob holder includes a coil to provide an electric field at the key fob holder. A key fob in the key fob holder may be powered via the electric field. Further, a request for authorization to operate the vehicle and select a vehicle operating mode may be broadcast to the key fob via the electric field or a set of contacts. Method 400 proceeds to 412 after searching for a key fob in the key fob holder.

At 412, method 400 judges whether or not a valid or assigned key fob is in the vehicle cabin. In one example, method 400 judges whether or not a valid or assigned key fob is in the vehicle based on a sequence broadcast by the key fob. The sequence may be broadcast via radio frequency (RF) and the sequence may include encoded numbers and letters. If method 400 judges that a valid or assigned key fob is present in the vehicle cabin, the answer is yes and method 400 proceeds to 416. Otherwise, the answer is no and method 400 proceeds to 414.

At 414, method 400 judges whether or not a valid or assigned key fob is in the key fob holder. In one example, method 400 judges whether or not a valid or assigned key fob is in the key fob holder based on a sequence transmitted by the key fob to the key fob holder. The sequence may be transmitted to the coil in the key fob holder or a set of contacts. The sequence may include encoded numbers and letters. If method 400 judges that a valid key fob is present in key fob holder, the answer is yes and method 400 proceeds to 418. Otherwise, the answer is no and method 400 proceeds to 450.

At 416, method 400 judges whether or not a valid or assigned key fob is in the key fob holder. The key fob may transmit a sequence to the coil in the key fob holder or a set of contacts. The sequence may include encoded numbers and letters. If method 400 judges that a valid or assigned key fob is present in key fob holder, the answer is yes and method 400 proceeds to 418. Otherwise, the answer is no and method 400 proceeds to 420.

At 418, method 400 judges whether or not the key fob in the key fob holder is programmed to authorize the higher performance vehicle operating mode. In one example, a vehicle controller compares a sequence transmitted by the key fob to a predetermined sequence stored in memory. If the two sequences are identical, the higher performance vehicle operating mode is authorized by a qualified key fob. If the two sequences are not identical, the higher performance vehicle operating mode is not authorized by the key fob. Method 400 proceeds to 422 if the higher performance mode is authorized by the key fob. Otherwise, method 400 proceeds to 420.

At 420, method 400 starts the vehicle in standard or lower performance mode. Lower performance mode may be facilitated by operating the engine, motor, and/or transmission with a first group of control parameters. The control parameters may include but are not limited to providing for a lower current amount supplied to a motor, a reduction in boost for a turbocharged engine, shorter duration intake valve opening time for an internal combustion engine, retarded spark timing for an internal combustion engine, limited throttle opening amount for an internal combustion engine, reduced fuel amount for an internal combustion engine, longer duration transmission shift times, reduced maximum vehicle speed, reduced maximum wheel torque, and/or other control parameters that limit vehicle performance as compared to the vehicle control parameters when the engine is operated in the higher performance mode. For example, a maximum wheel torque in the standard vehicle performance mode is less than a maximum wheel torque in the higher vehicle performance mode. In another example, a maximum vehicle speed in the standard vehicle performance mode is less than a maximum vehicle speed in the higher vehicle performance mode. Method 400 proceeds to exit after the engine begins to operate according to the first group of control parameters that deliver lower vehicle performance as compared to operating the vehicle using the second group of parameters in the higher performance mode.

At 422, method 400 starts the vehicle in the higher performance mode. Higher performance mode may be facilitated by operating the engine, motor, and/or transmission with a second group of control parameters. The second group of control parameters may provide for a higher current amount supplied to a motor, an increase in boost for a turbocharged engine, longer duration intake valve opening time for an internal combustion engine, advanced spark timing for an internal combustion engine, allowance for a wide open throttle opening amount for an internal combustion engine, increased fuel amount for an internal combustion engine, shorter duration transmission shift times, and/or other control parameters that increase vehicle performance as compared to the vehicle control parameters when the engine is operated in the standard performance mode. Method 400 proceeds to exit after the engine begins to operate according to the second group of control parameters that deliver higher vehicle performance as compared to the operating the vehicle using the first group of parameters in the lower performance mode.

In this way, one or more remote signaling key fobs that are programmed to allow operation of the same vehicle, but at different performance levels, may be present in the vehicle's passenger cabin without creating operating priority issues. Further, a way of ensuring a repeatable priority between the two key fobs and the two vehicle performance levels is established.

Thus, the method of FIG. 4 provides for selecting vehicle performance, comprising: selecting a first vehicle performance level and operating a vehicle at the first vehicle performance level in response to a key fob being within a vehicle cabin and outside of a key fob holder; and selecting a second vehicle performance level and operating the vehicle in at the second vehicle performance level in response to a key fob being within the key fob holder. The method includes where the first vehicle performance level is based on a first group of vehicle control parameters and where the second vehicle performance level is based on a second group of vehicle control parameters. The method includes where the key fob transmits a security token to a vehicle controller.

In some examples, the method further comprises selecting the first vehicle performance level and operating the vehicle at the first performance level in response to the key fob being within the key fob holder and the second vehicle performance level being locked out or prohibited via the key fob. The method of claim 4, where the second vehicle performance level is locked out via operating one or more switches on the key fob. The method further comprises ceasing to lock out the second vehicle performance level in response to operating the one or more switches on the key fob. The method further comprises ceasing to lock out the second vehicle performance level in response to a signal from a vehicle controller.

The method of FIG. 4 also provides for selecting vehicle performance, comprising: selecting a first vehicle performance level in response to a first key fob assigned a first vehicle performance level and a second key fob assigned a second vehicle performance level different than the first vehicle performance level being within a vehicle cabin and outside of a key fob holder, the first and second key fobs having security tokens assigned to a same vehicle; selecting a second vehicle performance level, and not the first vehicle performance level, only when the second key fob in within the key fob holder; and operating the same vehicle according to the first or second vehicle performance level.

In one example, the method includes where the first vehicle performance level is based on a first group of vehicle control parameters and where the second vehicle performance level is based on a second group of vehicle control parameters. The method also includes where the first vehicle performance level is selected before an engine is started. The method includes where the first key fob has a first security token and where the second key fob has a second security token. The method further comprises not selecting the second vehicle performance level and selecting the first vehicle performance level when the second key fob is in the key fob holder in response to deactivating the second vehicle performance mode via one or more switches of the second key fob. The method further comprises reactivating the second vehicle performance mode via the one or more switches of the second key fob. The method further comprises selecting the first vehicle performance level in response to only the first key fob being within the vehicle cabin.

Referring now to FIG. 6, a schematic of an example key fob is shown. Key fob 125 does not include a key blade or other apparatus for communicating with a key way of a lock. Instead, key fob 125 may transmit a radio frequency signal upon receiving a broadcast command from a vehicle or engine controller within a vehicle's passenger cabin.

In this example, key fob 125 includes pushbutton switches 606, 608, 610, and 612. However, in other examples, key fob 125 may include a different number of switches and the switches may perform different operations. Pushbuttons 606, 608, 610, and 612 provide input to application specific integrated circuit or microcontroller 620, and microcontroller 620 broadcasts security tokens (e.g., data sequences) to the vehicle controller.

In a first mode, applying pushbutton switch 606 causes key fob 125 to transmit a signal to the vehicle controller to unlock vehicle doors. Further, applying pushbutton switch 608 causes key fob 125 to transmit a signal to the vehicle controller to lock vehicle doors. Further still, applying pushbutton switch 610 causes key fob 125 to transmit a signal to the vehicle controller to sound the vehicle's horn. Finally, applying pushbutton switch 612 causes key fob 125 to transmit a signal to the vehicle controller to open the vehicle's trunk.

Pushbutton switches may also operate in a second mode to allow the key fob holder to define which vehicle performance operating modes may be activated via the key fob. For example, pushbutton switches 606 and 608 may be simultaneously applied for a predetermined amount of time to enter key fob programming mode. LED lights 602 and 604 may illuminate in a predetermined sequence when key fob 125 is in programming mode. Once in programming mode pushbutton 610 may be applied and released a desired number of times to indicate a number of hours the second higher performance vehicle operating mode is not to be transmitted by key fob 125. Pushbutton 612 may be applied to cancel high vehicle performance mode lockout so that the higher vehicle performance mode is reactivated. In this way, key fob may inhibit or lock out the higher vehicle performance mode by not transmitting the higher performance mode sequence while still transmitting the standard performance mode sequence. The vehicle may operate in the higher performance operating mode when key fob 125 transmits the higher performance operating mode sequence from the key fob holder in the vehicle's passenger cabin.

Key fobs that only allow the standard vehicle performance mode may look like key fob 125, but such key fobs may not include LEDs 602 and 604 since no programming mode is available in these key fobs. Further, in some examples, key fob 125 may be programmed via a display panel while installed in the key fob holder. For example, the person in possession of the key fob installs the key fob in the key fob holder and instructs the key fob to not broadcast a signal to allow the vehicle to operate in the higher performance mode for a predetermined amount of time. Once the predetermined amount of time expires, the key fob may once again transmit the signal that allows the higher performance vehicle operating mode. Thus, one single key fob may act to allow or prohibit entry into the higher performance vehicle operating mode.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for selecting vehicle performance, comprising:
   selecting a first vehicle performance level and operating a vehicle at the first vehicle performance level in response to a key fob being within a vehicle cabin and outside of a key fob holder; and
   selecting a second vehicle performance level and operating the vehicle at the second vehicle performance level in response to the key fob being within the key fob holder.

2. The method of claim 1, where the first vehicle performance level is based on a first group of vehicle control parameters and where the second vehicle performance level is based on a second group of vehicle control parameters.

3. The method of claim 1, where the key fob transmits a security token to a vehicle controller, and where a maximum wheel torque at the first vehicle performance level is less than a maximum wheel torque at the second vehicle performance level.

4. The method of claim 1, further comprising selecting the first vehicle performance level and operating the vehicle at the first performance level in response to the key fob being within the key fob holder and the second vehicle performance level being locked out via the key fob.

5. The method of claim 4, where the second vehicle performance level is locked out via operating one or more switches on the key fob.

6. The method of claim 5, further comprising ceasing to lock out the second vehicle performance level in response to operating the one or more switches on the key fob.

7. The method of claim 5, further comprising ceasing to lock out the second vehicle performance level in response to a signal from a vehicle controller.

8. A method for selecting vehicle performance, comprising:
   selecting a first vehicle performance level in response to a first key fob assigned the first vehicle performance level and a second key fob assigned a second vehicle performance level, the second vehicle performance level different than the first vehicle performance level, being within a vehicle cabin and outside of a key fob holder, the first and second key fobs having security tokens assigned to a same vehicle;
   selecting the second vehicle performance level, and not the first vehicle performance level, only when the second key fob is within the key fob holder; and
   operating the same vehicle according to the first or second vehicle performance level.

9. The method of claim 8, where the first vehicle performance level is based on a first group of vehicle control parameters and where the second vehicle performance level is based on a second group of vehicle control parameters, and where the first key fob and the second key fob are assigned to the vehicle.

10. The method of claim 8, where the first vehicle performance level is selected before an engine is started, and where a maximum vehicle speed at the first vehicle performance level is less than a maximum vehicle speed at the second vehicle performance level.

11. The method of claim 8, where the first key fob has a first security token and where the second key fob has a second security token.

12. The method of claim 8, further comprising not selecting the second vehicle performance level and selecting the first vehicle performance level when the second key fob is in the key fob holder in response to deactivating the second vehicle performance level via one or more switches of the second key fob.

13. The method of claim 12, further comprising reactivating the second vehicle performance level via the one or more switches of the second key fob.

14. The method of claim 8, further comprising selecting the first vehicle performance level in response to only the first key fob being within the vehicle cabin.

15. A vehicle performance control system, comprising:
- a first vehicle performance selecting device for solely activating a first vehicle operating performance level;
- a second vehicle performance selecting device for activating the first vehicle operating performance level and a second vehicle operating performance level; and
- a controller including executable instructions to operate a vehicle in the first vehicle operating performance level or the second vehicle operating performance level depending on a position of the second vehicle performance selecting device within a vehicle cabin.

16. The vehicle performance control system of claim 15, where the first vehicle operating performance level is a lower vehicle performance level than the second vehicle operating performance level, and where the vehicle is operated when in the first vehicle operating performance level and the second vehicle operating performance level.

17. The vehicle performance control system of claim 15, where the second vehicle performance selecting device includes one or more switches for deactivating the second vehicle operating performance level.

18. The vehicle performance control system of claim 16, where the second vehicle performance selecting device includes circuitry to deactivate the second vehicle operating performance level for a predetermined amount of time.

19. The vehicle performance control system of claim 18, where the second vehicle performance selecting device includes circuitry for automatically reactivating the second vehicle operating performance level after the predetermined amount of time.

20. The vehicle performance control system of claim 15, further comprising additional instructions to operate the vehicle in the first vehicle operating performance level in response to the first vehicle performance selecting device being within the vehicle cabin.

* * * * *